United States Patent
Pippel et al.

(10) Patent No.: US 9,791,061 B2
(45) Date of Patent: Oct. 17, 2017

(54) VALVE

(71) Applicant: HYDAC FLUIDTECHNIK GMBH, Sulzbach/Saar (DE)

(72) Inventors: Olaf Pippel, Chicago, IL (US); Frank Schulz, Blieskastel-Bierbach (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/893,094

(22) PCT Filed: May 2, 2014

(86) PCT No.: PCT/EP2014/001173
§ 371 (c)(1),
(2) Date: Nov. 23, 2015

(87) PCT Pub. No.: WO2014/194974
PCT Pub. Date: Dec. 11, 2014

(65) Prior Publication Data
US 2016/0116075 A1    Apr. 28, 2016

(30) Foreign Application Priority Data

Jun. 8, 2013  (DE) .................. 10 2013 009 650

(51) Int. Cl.
*F16K 27/12* (2006.01)
*F16K 27/00* (2006.01)
(Continued)

(52) U.S. Cl.
CPC ............ *F16K 27/003* (2013.01); *F16B 21/12* (2013.01); *F16B 21/125* (2013.01); *F16B 21/18* (2013.01);
(Continued)

(58) Field of Classification Search
CPC ........ F16K 27/00; F16K 27/003; F16K 27/04; F16K 27/041; F16K 27/06; F16K 27/065;
(Continued)

(56) References Cited

U.S. PATENT DOCUMENTS 3,326,580 A * 6/1967 Munier .................. F16B 21/18
                                                       285/192
4,284,097 A   8/1981 Becker et al.
(Continued)

FOREIGN PATENT DOCUMENTS

CH    682 003    6/1993
DE    79 31 792  11/1979
(Continued)

OTHER PUBLICATIONS

International Search Report (ISR) dated Jul. 4, 2014 in International (PCT) Application No. PCT/EP2014/001173.

*Primary Examiner* — Jessica Cahill
*Assistant Examiner* — Ian Paquette
(74) *Attorney, Agent, or Firm* — Wenderoth, Lind & Ponack, L.L.P.

(57) ABSTRACT

A valve, in particular for hydraulic circuits, includes a valve body (4) designed as a cartridge that can be fixed in a housing (6) having fluid connections (8) by a securing device (20, 26, 28). The securing device has at least one blocking element (20) in the form of a separate component between the valve body (4) and the housing (6). The blocking element has blocking surfaces that can be moved relative to the longitudinal axis (18) of the valve body (4) between an assembly position allowing the valve body (4) to be inserted into the housing (6) and a blocking position in which the blocking surfaces secure the valve body in an (Continued)

assembly position, preferably with zero backlash by bearing against retaining surfaces (26, 28) of the housing (6) and the valve body (4).

14 Claims, 4 Drawing Sheets

(51) Int. Cl.
*F16K 27/08* (2006.01)
*F16K 27/06* (2006.01)
*F16K 27/04* (2006.01)
*F16B 21/12* (2006.01)
*F16B 21/18* (2006.01)

(52) U.S. Cl.
CPC .......... *F16B 21/183* (2013.01); *F16B 21/186* (2013.01); *F16K 27/041* (2013.01); *F16K 27/065* (2013.01); *F16K 27/08* (2013.01); *F16K 27/12* (2013.01)

(58) Field of Classification Search
CPC .......... F16K 27/08; F16K 27/12; F16B 21/12; F16B 21/125; F16B 21/14; F16B 21/16; F16B 21/18; F16B 21/183; F16B 21/186
USPC ............. 137/315.11, 315.12, 315.13, 315.14
See application file for complete search history.

(56) References Cited

U.S. PATENT DOCUMENTS

| | | | |
|---|---|---|---|
| 4,714,236 A | | 12/1987 | Filiberti |
| 5,364,067 A | * | 11/1994 | Linkner, Jr. .......... B60T 8/3675 137/454.2 |
| 5,681,098 A | * | 10/1997 | Ganzel .................... B60T 8/363 251/129.15 |
| 6,561,597 B1 | | 5/2003 | Ota |
| 6,708,948 B2 | * | 3/2004 | Nosel ........................ F16K 5/02 251/288 |
| 2001/0007354 A1 | | 7/2001 | Tokuda et al. |
| 2014/0191452 A1 | * | 7/2014 | Moss ........................ F16F 9/43 267/119 |

FOREIGN PATENT DOCUMENTS

| | | |
|---|---|---|
| DE | 199 55 264 | 6/2001 |
| DE | 10 2004 027 041 | 12/2005 |
| DE | 20 2006 013 531 | 2/2008 |
| EP | 1 083 372 | 3/2001 |
| EP | 1 115 954 | 7/2001 |
| EP | 1 331 425 | 7/2003 |
| GB | 2 079 864 | 1/1982 |
| GB | 2 271 165 | 4/1994 |

* cited by examiner

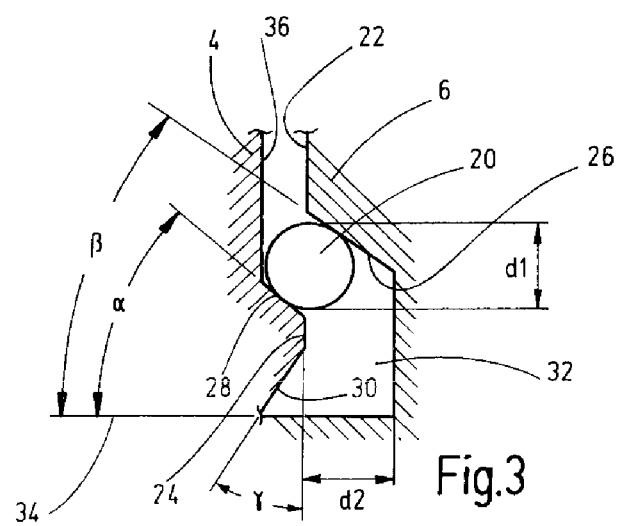
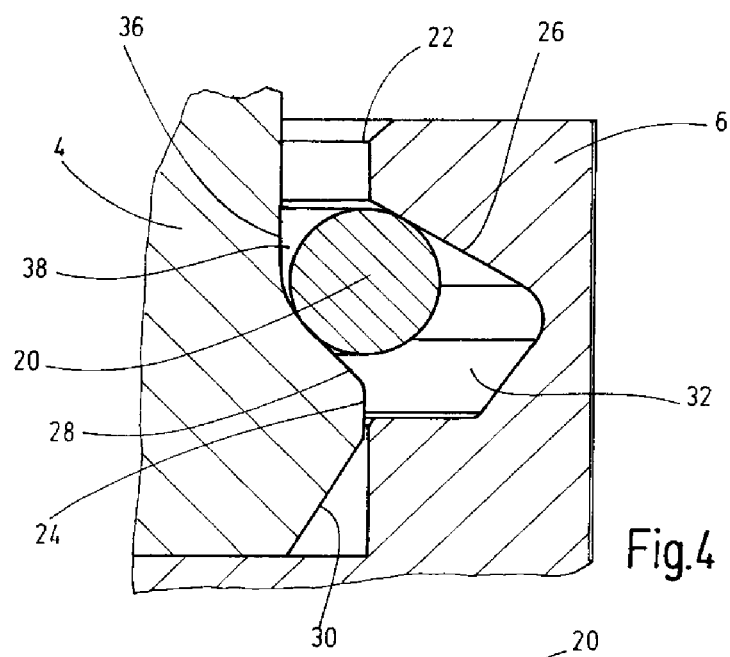
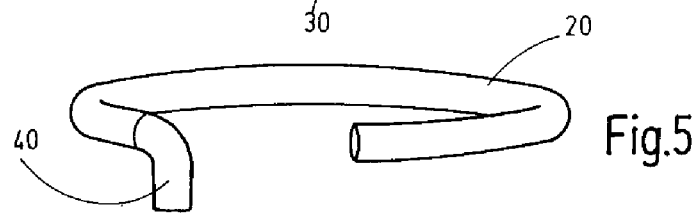

VALVE

FIELD OF THE INVENTION

The invention relates to a valve, in particular for use in hydraulic circuits, having a valve body designed as a cartridge. The valve body can be integrated into a housing that has fluid ducts and can be fixed therein by a securing device.

BACKGROUND OF THE INVENTION

Such valves, which are known as cartridge valves in technical terminology and which are provided as hydraulic components in hydraulic systems, are known from the prior art. For example, the patent documents EP 1 882 122 B1 and DE 10 2011 010 474 A1 disclose valves of this type in the form of proportional pressure control valves. As the securing device, a central thread is provided with an external thread being situated on the valve body and an internal thread at an installation opening of the housing. Appropriate tightening torque is required to ensure adequate securing. This securing relies for the most part on the stress to be anticipated during operation, the materials used for the valve bodies and the screw mounting housing, and the securing geometry. Even when a required torque is achieved, to guarantee that the arrangement is highly secure, additional complex screw retention methods are required, such as adhesive and/or the use of toothed lock washers and the like.

Another known method for securing cartridge-type valve bodies proposes the use of attachment flanges, which can be screwed to the housing and which project laterally from the magnet actuator assigned to the valve body. A drawback of this known solution is that the laterally protruding flange leads to a significant increase in the installation space required, which is particularly problematic when the valves concerned are to be inserted into a housing formed by a control block, in which multiple valves are to be arranged next to one another.

SUMMARY OF THE INVENTION

An object of the invention is to provide an improved valve having a valve body designed as a cartridge that incorporates the advantageous developments of the prior art, that permits a particularly easy and quick assembly and that reduces of the installation space required.

This objective is basically achieved according to the invention by a valve having, as an essential feature of the invention, a securing device including at least one blocking element in the form of a separate component located between the valve body and the housing. The blocking element has blocking surfaces that can be moved relative to the longitudinal axis of the valve body between an assembly position allowing the valve body to be inserted into the housing, and a blocking position, in which the blocking surfaces secure the valve body in an installation position by bearing against retaining surfaces of the housing and the valve body. The invention thus envisages, instead of securing by screw or threaded connections, such as a central thread or flange screw connections, a plug-type connection. The assembly then dispenses with screwing processes. Also, no need exists to attain specific torques. Thus, easy and quick valve assembly is allowed. Additional screw retentions are likewise dispensed with. This arrangement also results in a reduction in the required installation space, because no protruding components, such as a hexagon head for a wrench or an attachment flange, are required. The valve according to the invention is thus particularly suitable for an application in control blocks having a multitude of valves arranged next to one another. The space saving is particularly advantageous in the mobile hydraulics field, for example in construction machinery and municipal machinery, where smaller-dimensioned control blocks also result in a weight reduction.

Particularly advantageously, the respective blocking element can be formed by an annular body surrounding the valve body over at least a large part of a peripheral area. The annular body can be expanded for an installation operation into the assembly position by elastic deformation. When the installation position is reached, the annular body assumes the blocking position by recovery of shape. In the blocking position, the annular body comes to bear via the blocking surfaces against the retaining surfaces. In this way a plug-type connection of the snap-lock kind is produced that, with an assembly operation realized by insertion, is automatic as a result of the snap back of the deformed annular element.

In particularly advantageous exemplary embodiments, an annular body is provided in the form of a metal snap ring having a round cross-section.

Particularly preferably, the annular body is accommodated in an installation space situated in the housing. That installation space, relative to the longitudinal axis defined by the valve body, has a radial depth allowing an expansion of the snap ring and is axially delimited on the side facing the installation opening of the housing by an angular surface. The angular surface forms the retaining surface of the housing and secures the snap ring against movement toward the installation opening. The radial depth of the installation space is greater than the cross-section diameter of the snap ring, so that the snap ring can be sufficiently expanded to allow the insertion of the valve body.

Particularly preferably, an additional angular surface is situated on the valve body in front of a section having the largest external diameter in the installation direction and forms an insertion chamfer. The insertion chamfer expands the snap ring during the installation operation into the installation space. The deformation of the snap ring thus occurs automatically, without the need for assembly tools, in the course of the insertion movement of the valve body. In particular, the insertion chamfer starts with a smaller diameter than the internal diameter of the blocking element, so that an expansion during the assembly can be more easily realized.

In particularly advantageous exemplary embodiments, an angular surface is provided in the installation direction, following the section having the largest external diameter, in addition to the retaining surface of the valve body interacting with the snap ring.

With regard to the design of the retaining surfaces, particularly preferably, the first angular surface forming the retaining surface of the housing and the additional angular surface forming the retaining surface of the valve body converge toward the longitudinal axis. The distance between them as they extend is then reduced to a value that is smaller than the cross-sectional diameter of the snap ring. By selection of the angle of convergence of the housing-side angular surface and the valve body-side angular surface, the snap ring, in the course of its recovery of shape, in other words, as a result of its elastic force, is ensured to clamp onto both retaining surfaces. This arrangement provides the particular advantage that during operation the valve is fixed without play in the axial direction because the snap ring is clamped between the retaining surfaces, even if nominal dimensions of the components vary due to manufacturing tolerances. Any different dimensions and distances are compensated for by the elastic clamping of the snap ring between the retaining surfaces.

In particularly advantageous exemplary embodiments, the snap ring includes an end part angled away from the ring plane. Also, a groove is provided in the valve body extending axially, and a bore is provided in the housing, extending axially from the installation space. The groove and the bore form an engagement space for the end part of the snap ring. The valve body, which is clamped in the installation position by the snap ring, is prevented from twisting by the snap ring connected non-rotationally to the housing. Anti-twist protection is particularly important when magnetic valves are used, so as to prevent the occurrence of rotational movement during operation, for example as a result of vibrations or the like. A twisting of the connection cable can result in damage thereto and to the corresponding plug connector.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is a partial side view in section illustrating the functioning of a valve securing device according to an exemplary embodiment of the invention;

FIG. 4 is an enlarged partial side view in section of only the one side of the securing device according to the exemplary embodiment of the valve according to the invention;

FIG. 5 is a perspective view of a snap ring as a component of the securing device of the exemplary embodiment of the invention;

DETAILED DESCRIPTION OF THE INVENTION

Figure 1:
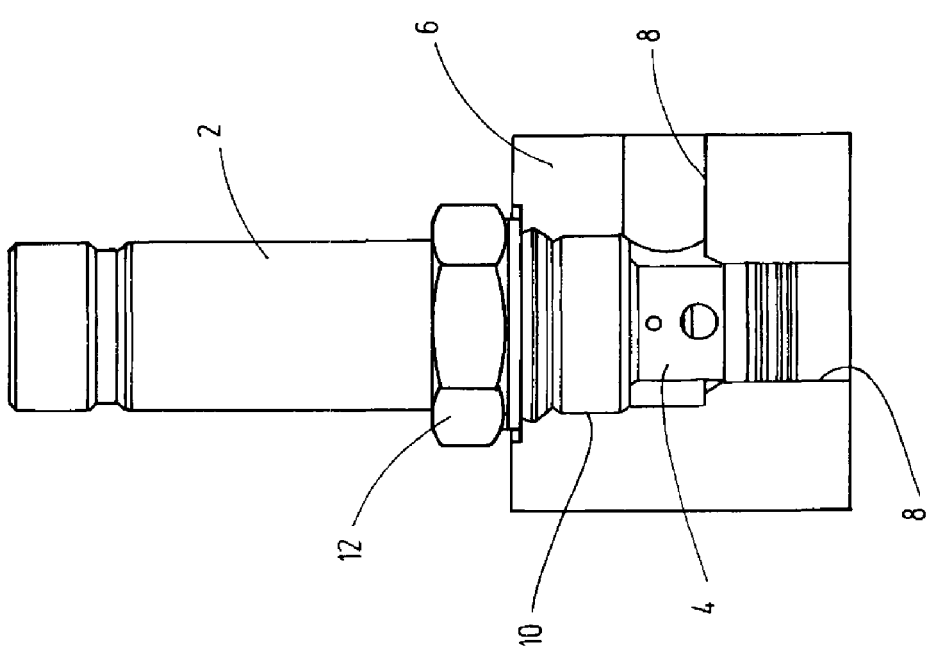
FIGS. 1 and 2 are side views respectively showing a cartridge valve according to the prior art, wherein two different designs of the securing device thereof are depicted with the respective housing being cut open.
Figure 2:
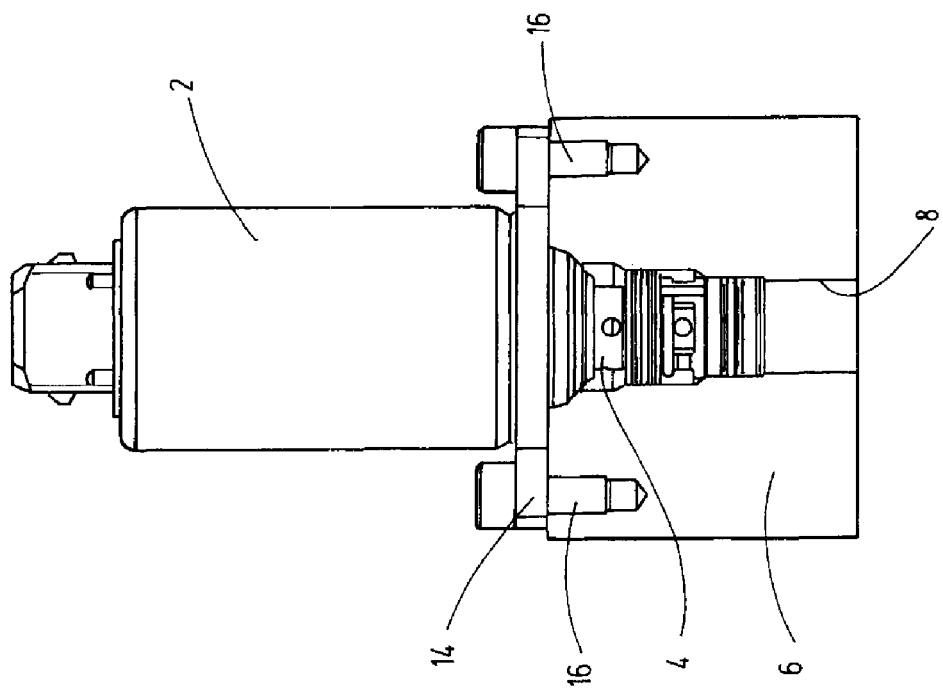

The cartridge valves of the prior art, which are depicted in FIGS. 1 and 2, can be designed as proportional pressure control valves and are provided with an actuating magnet 2. This actuating magnet serves, in the method corresponding to the prior art, to activate a control piston or a control gate valve that is movable in a valve body 4 and that is not visible. The valve body 4 is mounted by f a securing device in a housing 6 that has fluid connections 8. In the design shown in FIG. 1, the securing device is formed by a central thread 10. To realize the screw connection to the central thread 10, the valve body 4 includes a hexagon head 12 to generate by a wrench the tightening torque required for the screw connection. In the example of the prior art shown in FIG. 2, the securing device is formed by a flange screw connection. For this purpose an attachment flange 14 is connected to the non-visible pole core of the actuating magnet 2. Flange 14 projects laterally from the actuating magnet 2 and is screwed at the protruding regions to the housing 6 by fastening screws 16.

The valve according to the invention may conform to the prior art in terms of the actuating magnet 2 and the functional design of the valve body 4 and of the housing 6. The fundamental difference compared with the prior art is that the securing device has no screw connections, whether a central thread or a flange screw connection, and is in the form of a plug-type connection. In the exemplary embodiment depicted, this connection is realized as a snap-lock connection by a blocking element in the form of a snap ring 20, see FIG. 5, in which the snap ring 20 is depicted separately, and also FIG. 6, which depicts the valve in the snap ring 20-secured installation position.

In the present example, the snap ring 20 is a steel ring having a round cross section.

Figure 6:
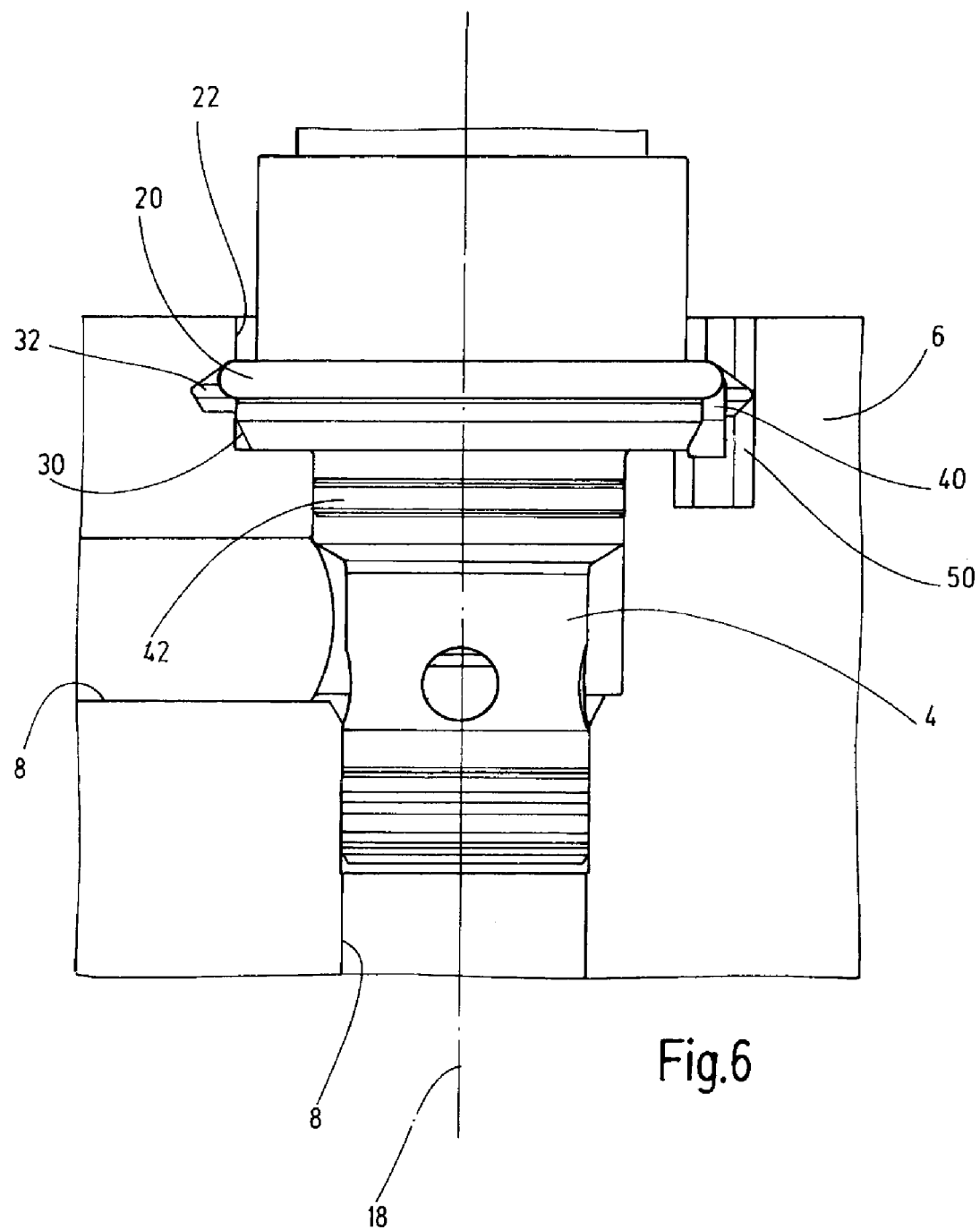
FIG. 6 is a side view of the valve according to the exemplary embodiment of the invention with the housing cut open.

FIG. 3 shows the functional principle of the snap-lock connection, which is produced as a result of the geometry of the regions of the housing 6 and the valve body 4 adjoining the snap ring 20. In FIGS. 3 and 4 show the installation opening 22 of the housing 6 and the region 24 having the largest diameter of the valve body 4. In the region 24, the external diameter of the valve body 4 is only slightly smaller than the internal diameter of the installation opening 22 to allow the insertion of the valve body 4 during the assembly operation. In FIGS. 3, 4 and 6, each of which shows the installation position, the snap ring 20 is in a state in which it is expanded to some extent compared with its unstressed nominal diameter. In other words, it is radially tensioned and rests, by blocking surfaces formed by its surface, on retaining surfaces for the axial securing of the valve body 4, namely on a first angular surface 26 of the housing 6 and an additional or second angular surface 28 of the valve body 4. For the insertion of the valve body 4, the snap ring 20 must be expanded further from the depicted position. For this purpose, an additional or third angular surface 30 is provided on the valve body 4, in front of the region 24 having the largest diameter in the installation direction, which angular surface 30 forms an insertion chamfer. The installation chamfer expands the snap ring 20 during the insertion operation. For a reliable expansion, the third angular surface 30, together with the direction of the installation movement, form an angle identified by γ in FIG. 3, which angle measures less than 45°, and preferably measures approximately 30°. To provide space for the expansion, the snap ring 20 is accommodated in the housing 6 in an annular groove 32, the radial depth $d_2$ of which is greater than the cross-sectional diameter $d_1$ of the snap ring 20. The first angular surface 26 provided on the housing 6 extends from the radially outer end of the groove 32 to the installation opening 22 and forms an angle β with the radial plane 34 (FIG. 3). The radial plane 34 is perpendicular to the longitudinal axis. The additional angular surface 28 extends on the valve body 4 from the region 24 having the largest diameter to a peripheral area 36 with a reduced external diameter. Peripheral area 36 forms together with the installation opening 22 a slot. Additional angular surface 28 extends relative to the radial plane 34 at an angle α. As can be seen most clearly from FIG. 3, the angle α is larger than the angle β, so that the angular surfaces 26 and 28 converge radially inwards relative to one another, i.e., the gap between the angular surfaces 26 and 28 is reduced in a direction radially inward. In the present exemplary embodiment, the angle β is 6° smaller than the angle α. In the present example, the angle α is envisaged as 41°, and the angle β as 35°.

In the present example, the geometry is such that, with the convergence angle of 6°, the distance between the angular surfaces 26 and 28 is reduced at one point to a value that is smaller than the snap ring cross-sectional diameter d1, at a location before the snap ring 20 comes to bear against the peripheral area 36 of the valve body 4. In the installation position, a gap 38 (FIG. 4) then remains between the snap ring 20 subject to radial tension and the peripheral area 36 of the valve body 4. Because the clamping of the snap ring 20 then occurs between the angular surfaces 26, 28, before the snap ring 20 reaches a radial end position on the peripheral area 36, tolerance-related dimensional differences are compensated for, so that the formed plug-type connection is always free of axial play. As FIG. 6 shows, the valve body 4 is sealed relative to the housing 6 in the installation position by a seal in the form of an O-ring 42.

Figure 7:
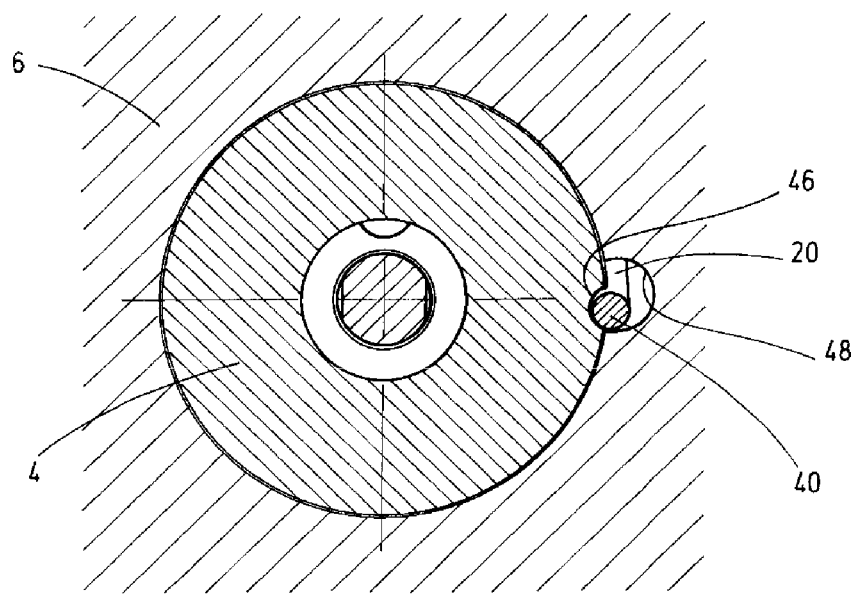
FIGS. 7 and 8 are plan views in section of the exemplary embodiment, in which two different anti-twist protection designs are shown.
Figure 8:
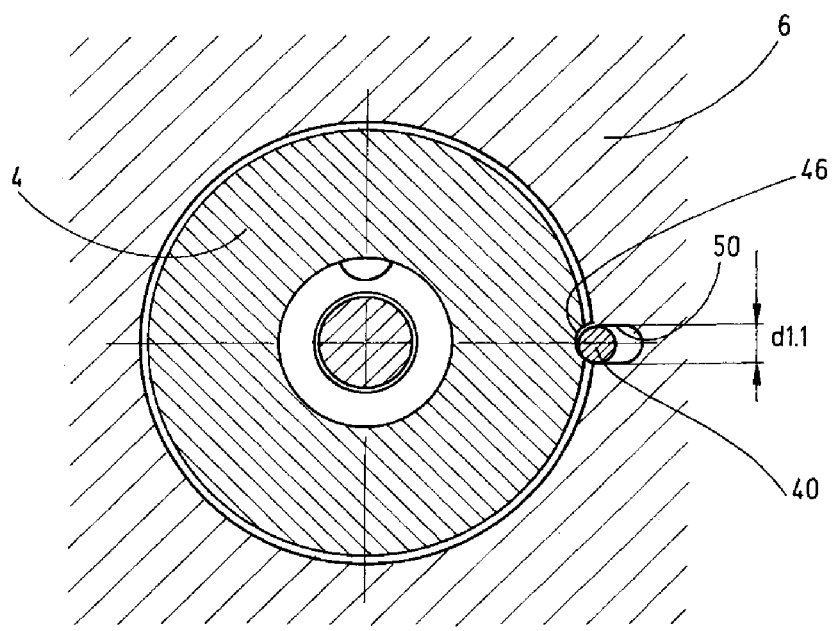

As FIG. 5 shows, the snap ring 20 includes an end part 40 bent away from the ring plane at a right angle. As FIGS. 7 and 8 show, the end part 40 can, in interacting with a groove 46 extending in the valve body 4 in longitudinal direction and with an engagement space formed in the housing 6, constitute anti-twist protection for the valve body 4. In the example shown in FIG. 7, the engagement space is formed by a bore 48 in the housing 6. During the assembly operation, care is taken to ensure that the groove 46 in the valve body 4 and the housing bore 48 are aligned, so that the angled away end part 40 of the snap ring 20 engages in the groove 46 and prevents the valve body 4 from twisting. In the example of FIG. 7, a smaller angle of twist, of up to approximately 10°, is possible due to the diameter of the bore 48. By contrast, the example of FIG. 8 shows, instead of the housing bore 48, a groove 50 extending in the housing 6 in longitudinal direction, the width d1.1 of which is slightly larger than the cross-sectional diameter d1 of the snap ring 20. The groove 50 adapted to the cross-sectional diameter d1 also prevents small rotational movements. However, the introduction of the groove 50 is somewhat more complex in manufacturing terms by comparison with the introduction of a bore 48.

The depicted design of the blocking element in the form of a stainless steel snap ring 20 corresponds to a preferred embodiment. However, a snap ring made from another metallic material with sufficient modulus of elasticity can also be used. A plastic ring can likewise be envisaged, if the valve is able to have play in axial direction and the operational forces do not exceed permissible values, and highly-rigid fiber-reinforced plastics are to be given preference for applications. A steel wire, which is threaded into the groove and which is not in a ready-made form, can also be used. In addition, cables can also be used as the blocking element. Both of the last-mentioned variants require a correspondingly dimensioned introduction into the groove, in other words, a radial access to the groove, for example in the form of an inclined borehole.

While one embodiment has been chosen to illustrate the invention, it will be understood by those skilled in the art that various changes and modifications can be made therein without departing from the scope of the invention as defined in the claims.

The invention claimed is:

1. A valve comprising:
   a housing having fluid connections;
   a cartridge valve body mounted in said housing and having a longitudinal axis;
   a securing device fixing said valve body in said housing, said securing device having a blocking element being a separate component part relative to and located between said housing and said valve body, said blocking element having blocking surfaces movable relative to said longitudinal axis between an assembly position allowing said valve body to be inserted into said housing and a blocking position in which said blocking surfaces secure said valve body in an installation position in said valve body;
   said blocking element being an annular body, said annular body being expandable by elastic deformation for installation of said valve body in said housing into the assembly position and having shape recovery into the blocking position when the installation position is reached such that said blocking surfaces engage retaining surfaces on said valve body, said annular body being in an installation space in said housing, said installation space having a radial depth relative to said longitudinal axis allowing radial expansion of said annular body in the assembly position and being axially delimited on a side facing an installation opening of said housing by a first housing angular surface, said first housing angular surface retaining said annular body against movement toward the installation opening; and
   a third body angular surface on said valve body being in front of a valve body section with a largest external diameter of said valve body, said third body angular surface forming an insertion chamfer that allows expansion of said annular body radially into said installation space during installation of said valve body in said housing, said installation space having a radial dimension between said valve body section with the largest external diameter and a radial outer end of said installation space greater than a cross-sectional diameter of said annular body to allow radial expansion of said annular body during the installation and removal of said valve body relative to said housing, said angular surfaces being non-perpendicular to said longitudinal axis.

2. A valve according to claim 1 wherein
said blocking surfaces secure said valve body in the blocking position without play.

3. A valve according to claim 1 wherein
said annular body comprises a metal snap ring having a round cross-sectional shape.

4. A valve according to claim 1 wherein
said annular body comprises an end part extending at an angle from a ring plane of said snap ring;
said valve body having an axially extending groove receiving said end part; and
said housing has a recess extending axially from said installation space receiving and forming an engagement space for said end part of said annular body.

5. A valve according to claim 1 wherein
said annular body comprises a snap ring.

6. A valve according to claim 1 wherein
said annular body comprises a metal snap ring.

7. A valve according to claim 1 wherein
said valve body comprises a valve body section with a largest external diameter of said valve body; and
a second body angular surface follows said valve body section in an installation direction of said valve body, said second angular surface interacting with said snap ring along with said first angular surface.

8. A valve according to claim 7 wherein
said first housing angular surface forms a retaining surface of said housing;

said second body angular surface forms a retaining surface of said valve body; and said retaining surfaces converge toward said longitudinal axis with distances between said retaining surfaces being reduced along extensions of said retaining surfaces to a value smaller than said cross-sectional diameter of said snap ring.

9. A valve according to claim 8 wherein said angular surfaces extend at acute angles relative to a plane extending perpendicularly to said longitudinal axis.

10. A valve according to claim 1 wherein said valve body comprises a second body angular surface following said valve body section in an installation direction of said valve body, said second body angular surface interacting with said annular body along with said first housing angular surface.

11. A valve according to claim 10 wherein said first housing angular surface forms a retaining surface of said housing;

said second body angular surface forms a retaining surface of said valve body; and said retaining surfaces converge toward said longitudinal axis with distances between said retaining surfaces being reduced along extensions of said retaining surfaces to a value smaller than said cross-sectional diameter of said annular body.

12. A valve according to claim 11 wherein said angular surfaces extend at acute angles relative to a plane extending perpendicularly to said longitudinal axis.

13. A valve according to claim 10 wherein said angular surfaces extend at acute angles relative to a plane extending perpendicularly to said longitudinal axis.

14. A valve according to claim 13 wherein said first housing angular surface extends at an angle relative to said plane greater than an angle said second body angular surface extends relative to said plane.

* * * * *